(12) United States Patent
Buehler et al.

(10) Patent No.: US 9,312,806 B2
(45) Date of Patent: Apr. 12, 2016

(54) ELECTRICAL TEST APPARATUS FOR A PHOTOVOLTAIC COMPONENT

(75) Inventors: Pat Buehler, Pemberville, OH (US);
David Kahle, Monclova, OH (US);
Matthew J. Mattin, Delta, OH (US);
Kevin Niebel, Toledo, OH (US)

(73) Assignee: First Solar, Inc., Perrysburg, OH (US)

( * ) Notice: Subject to any disclaimer, the term of this patent is extended or adjusted under 35 U.S.C. 154(b) by 201 days.

(21) Appl. No.: 13/453,635

(22) Filed: Apr. 23, 2012

(65) Prior Publication Data

US 2012/0268149 A1  Oct. 25, 2012

Related U.S. Application Data

(60) Provisional application No. 61/478,886, filed on Apr. 25, 2011.

(51) Int. Cl.
*G01R 31/26* (2014.01)
*H02S 50/10* (2014.01)

(52) U.S. Cl.
CPC ..................... *H02S 50/10* (2014.12)

(58) Field of Classification Search
CPC ...... G01R 31/26; G01R 31/405; G01R 31/02; G01R 21/06; G01R 19/00–19/175
USPC ....................... 324/750.08, 750.03
See application file for complete search history.

(56) References Cited

U.S. PATENT DOCUMENTS

| 5,482,571 | A | 1/1996 | Yamada et al. |
| 6,113,718 | A | 9/2000 | Yamada et al. |
| 6,856,862 | B1* | 2/2005 | Feltner ..................... 700/245 |
| 2004/0233520 | A1* | 11/2004 | Ketola et al. ............. 359/361 |
| 2006/0209915 | A1 | 9/2006 | Shima |
| 2007/0221548 | A1* | 9/2007 | Song et al. ................ 209/543 |
| 2008/0032502 | A1* | 2/2008 | Baskin et al. ............. 438/680 |
| 2008/0236655 | A1 | 10/2008 | Baldwin et al. |
| 2009/0183760 | A1 | 7/2009 | Meyer |
| 2009/0256581 | A1* | 10/2009 | Lu et al. .................... 324/715 |
| 2010/0117671 | A1 | 5/2010 | Vaaler et al. |
| 2011/0012635 | A1* | 1/2011 | Lu et al. ................ 324/757.03 |
| 2011/0053307 | A1* | 3/2011 | McDaniel et al. ......... 438/64 |
| 2011/0056538 | A1 | 3/2011 | Myong |
| 2011/0148432 | A1 | 6/2011 | Apfelthaler |
| 2011/0203630 | A1 | 8/2011 | Takano et al. |

FOREIGN PATENT DOCUMENTS

CN    201654176 U    11/2010

OTHER PUBLICATIONS

"Wet Insulation Test Using QuadTech Hipot Tester," QuadTech, Most Trusted in Electrical Testing, QuadTech, Inc., Aug. 2010, www.quadtech.com.
S. Kurtz, "Photovoltaic-Reliability R & D Toward a Solar-Powered World," National Renewable Energy Laboratory, Society of Photographic Instrumentation Engineers (SPIE) Solar Energy + Technology Conference San Diego, California, Aug. 2-6, 2009.

* cited by examiner

*Primary Examiner* — Son Le
(74) *Attorney, Agent, or Firm* — Blank Rome LLP

(57) ABSTRACT

The present invention relates to electrical test apparatuses for photovoltaic modules and methods of testing photovoltaic modules.

21 Claims, 4 Drawing Sheets

ELECTRICAL TEST APPARATUS FOR A PHOTOVOLTAIC COMPONENT

CROSS-REFERENCE TO RELATED APPLICATIONS

This application claims priority to Provisional U.S. Application No. 61/478,886, filed on Apr. 25, 2011, the disclosure of which is incorporated by reference in its entirety herein.

TECHNICAL FIELD

The present invention relates to electrical test apparatuses for photovoltaic components and methods of testing photovoltaic components.

BACKGROUND

Prior to sale, a photovoltaic module must pass a series of electrical and mechanical tests to assess safety and reliability of the device. In particular, photovoltaic modules must pass a wet high-potential test. The test is useful to identify insulation flaws that may result in safety hazards during use and to identify moisture leaks that may result in reduced performance. In addition, the test is useful to evaluate a device's susceptibility to electrochemical corrosion when placed in a wet environment. During the test procedure, a photovoltaic module is submersed in a surfactant solution, and a high voltage (e.g. 500 V) is applied to a current-carrying conductor within the device. Leakage current is measured between the current-carrying conductor and an electrical ground within the test apparatus. The amount of leakage current provides an indication of the device's insulation quality. However, test data is highly dependant on test factors including surfactant temperature and surfactant conductivity. As a result, repeatability is lacking when the test parameters are permitted to fluctuate.

DETAILED DESCRIPTION

Figure 1:
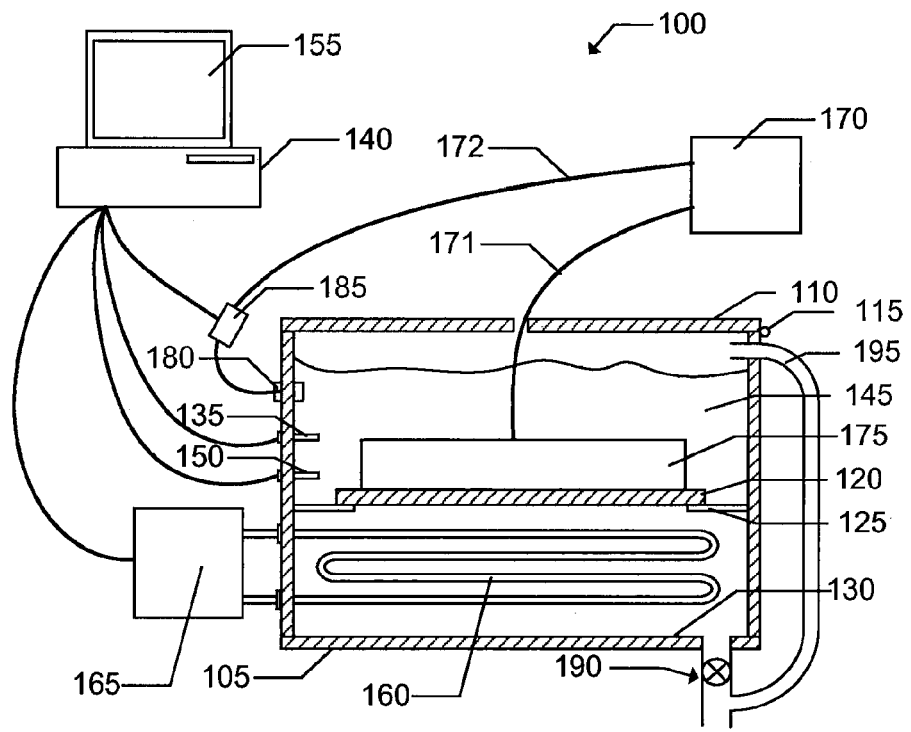
FIG. 1 is a cross-sectional view of an electrical test apparatus.

A photovoltaic module is a group of photovoltaic cells connected electrically and packaged into a frame or panel. A photovoltaic (PV) cell is a device, often made of a semiconductor material, that converts light energy or photons into electricity. When light strikes the PV cell, a certain portion of it is absorbed within the semiconductor material. The energy of the absorbed light or photon is transferred to the semiconductor material, where it forces electrons to escape from their normal positions associated with a particular atom. This flow of electrons generates a current. By placing conductive contacts, such as metal contacts, on the top and bottom of the PV cell, current can be drawn off for external use.

Prior to sale and certification, a photovoltaic module must pass a series of safety tests. Tests are performed on complete photovoltaic modules and on individual photovoltaic components. The tests assess the device's mechanical and electrical compliance. One such test is the wet high-potential test, set forth by the International Electrotechnical Commission (IEC), which confirms a product's insulation is sufficient to protect an operator from electrical shock even when the device is wet. During the test procedure, a photovoltaic module is submersed in a surfactant solution stored in an enclosure, and a high voltage (e.g. 500 V) is applied to a current-carrying conductor within the device. An electrical ground is provided within the enclosure. Leakage current is measured between the current-carrying conductor and the electrical ground. The amount of leakage current traveling through the device's insulation provides an indication of the insulation quality.

Results of the wet high-potential test procedure are highly dependent on solution temperature. Therefore, maintaining a consistent solution temperature during testing is critical to achieving repeatable data. Unfortunately, current test devices lack automated temperature control and data logging. As a result, a new test apparatus is needed to improve test repeatability.

Test devices used during compliance testing, such as the wet high-potential test, are known as electrical safety test devices. Electrical test devices are designed to measure and detect a multitude of items, including AC dielectric strength, DC dielectric strength, and insulation resistance. The AC and DC dielectric tests measure the withstand capability of an insulator, whereas an insulation resistance test measures the resistance of an insulator or insulation during a test. The wet high-potential test is an insulation resistance test. Devices which fail electrical compliance tests are not saleable, since their flawed designs could result in a hazardous or fatal amount of current flowing from the device to the user.

The testing method for high potential test devices can be automatic, semi-automatic, or manual. Some test devices are fully-automated and require no human involvement once testing has been initiated. These devices rely on stored programs to execute a test procedure or a series of test procedures. Conversely, manual testing requires the presence of an operator to physically control test parameters such as voltage and time. The operator may also need to record measurements such as leakage current. As a lower cost option compared to fully-automated systems, semi-automatic systems provide some of the benefits of fully automated systems while still requiring some operator input during testing.

Figure 2:
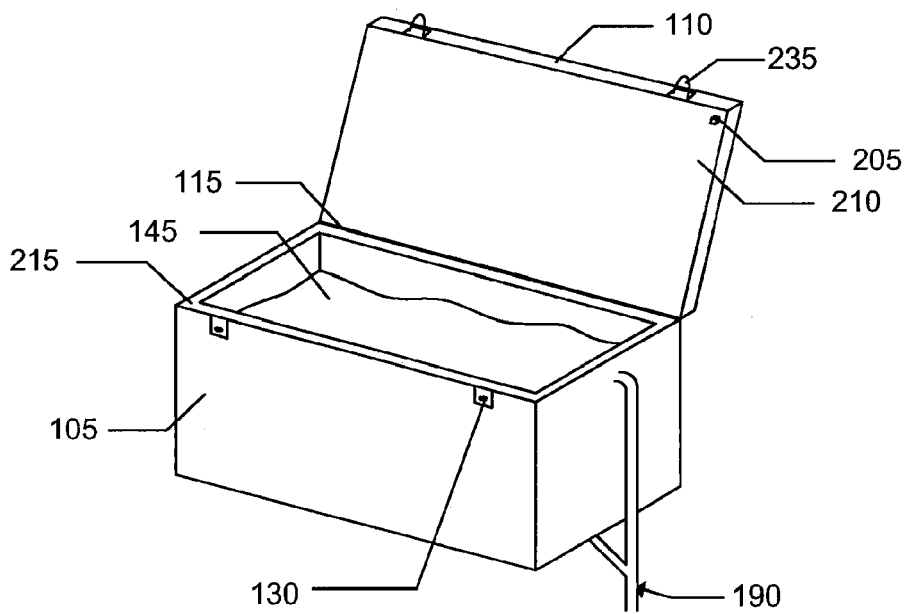
FIG. 2 is a perspective view of an electrical test apparatus.
Figure 3:
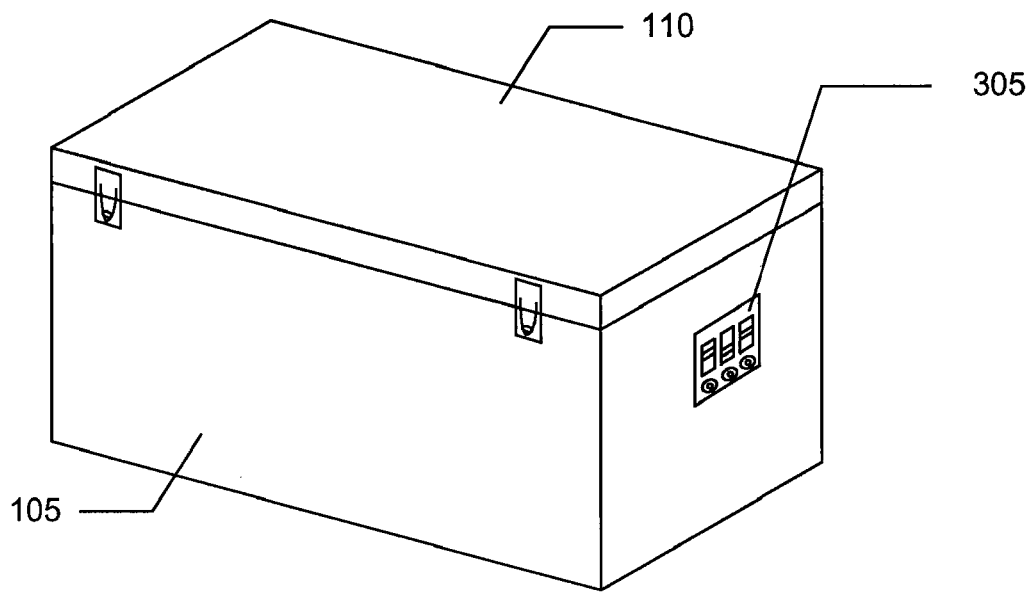
FIG. 3 is a perspective view of an electrical test apparatus.

As shown in FIG. 1, an electrical test apparatus 100 may include an enclosure 105 and a lid 110 attached to the enclosure 105. The lid 110 may be attached to the enclosure by any suitable connection, including, for example, a hinge 115, a coil, a spring, a piston, or any other suitable connection that allows the lid 110 to open and close relative to the enclosure 105. Alternately, the lid 110 can be fully detachable from the enclosure 105. FIG. 2 shows the enclosure 105 with the lid 110 in an open position, whereas FIG. 3 shows the lid 110 in a closed position. The test apparatus may include a seal (not shown) located between the lid 110 and a rim surface 215 of the enclosure 105. The seal may restrict evaporation of the solution. The seal may be attached to a bottom surface 210 of the lid. Alternately, the seal may be attached to the rim surface 215 of the enclosure 105. The lid 110 and the enclosure 105 may be constructed from any suitable material, including, for example, stainless steel, aluminum, polycarbonate, acrylonitrile butadiene styrene (ABS), polypropylene, polyethylene, fiberglass, polyvinyl chloride (PVC), and chlorinated polyvinyl chloride (CPVC). The test apparatus 100 may have a rectangular cuboid shape as shown in FIG. 2. Alternatively, the test apparatus 100 may be any suitable shape enabling it to receive a photovoltaic module or a component of a photovoltaic module for testing.

Figure 4:
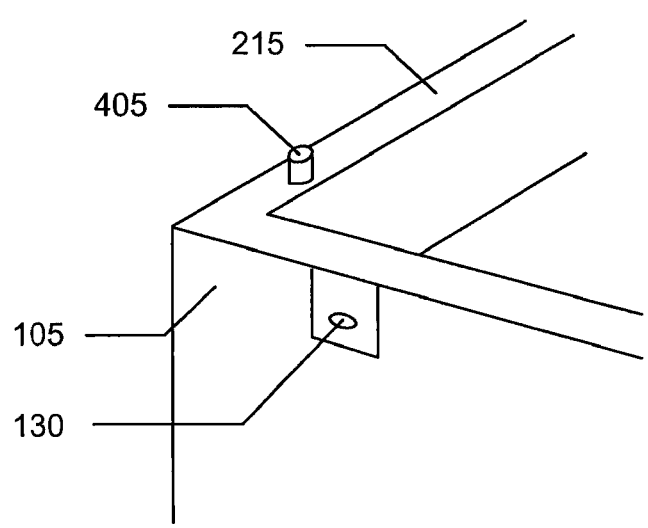
FIG. 4 is a perspective view of an electrical test apparatus.

As shown in FIG. 1, a support surface 120 may be disposed within the enclosure 105. For instance, the support surface 120 may be recessed downwardly from the rim surface 215 of the enclosure 105 as shown in FIG. 4. Also, the support surface 120 may be substantially parallel to a bottom surface of the enclosure 105. The support surface 120 may be any suitable material including, for example, stainless steel, aluminum, polycarbonate, acrylonitrile butadiene styrene (ABS), polypropylene, polyethylene, fiberglass, polyvinyl chloride (PVC), and chlorinated polyvinyl chloride (CPVC). Although the support surface is depicted as a solid plate in FIG. 1, it may also be any other suitable surface, including, for example, grating, bars, or hooks configured to support the photovoltaic component 175 being tested while also permitting a liquid medium to circulate freely within the enclosure. The photovoltaic component 175 may be a photovoltaic module or any component used to construct a photovoltaic module or array. For example, the photovoltaic component 175 may be a cord plate. In a solar module, the cord plate can be attached to a rear side of a module and functions as a junction box permitting interconnection with other modules and electrical components.

The liquid medium can include any suitable liquid. For example, the liquid medium can include a mixture. The liquid medium can include a solution. The solution can include any suitable solvent and any suitable solute. The solvent can include water and the solute can include a surfactant. By permitting the solution to circulate freely, temperature gradients may be avoided, thereby resulting in a more uniform solution temperature. Since test data is temperature dependent, repeatability will be improved.

The support surface 120 may be supported within the enclosure by any suitable supports 125. For example, the enclosure may contain supports 125 such as brackets, grooves, ledges, and fasteners to support the support surface 120. Alternately, the enclosure may be shallower than the enclosure shown in FIG. 1, and the support surface may define an inner bottom surface 130 of the enclosure 105.

As shown in FIG. 1, a temperature sensor 135 may be positioned within the enclosure 105. For instance, the temperature sensor may be inserted into the test apparatus 100 through an access hole in the side of the enclosure 105 and secured to the enclosure. Alternately, the temperature sensor may be mounted in any other suitable position within the enclosure 105, or it may float freely within the enclosure 105. The temperature sensor 135 may measure temperature of a solution 145 within the enclosure 105 and may be connected to a computer 140.

As shown in FIG. 1, an electrical conductivity sensor 150 may be positioned within the enclosure 105. For instance, the conductivity sensor may be inserted into the test apparatus 100 through an access hole in the side of the enclosure 105 and secured to the enclosure. Alternately, the conductivity sensor 150 may be mounted in any other suitable position within the enclosure 105, or it may float freely within the enclosure 105. The conductivity sensor may measure conductivity of the solution 145 within the enclosure 105 and may be connected to a computer 140.

Figure 6:
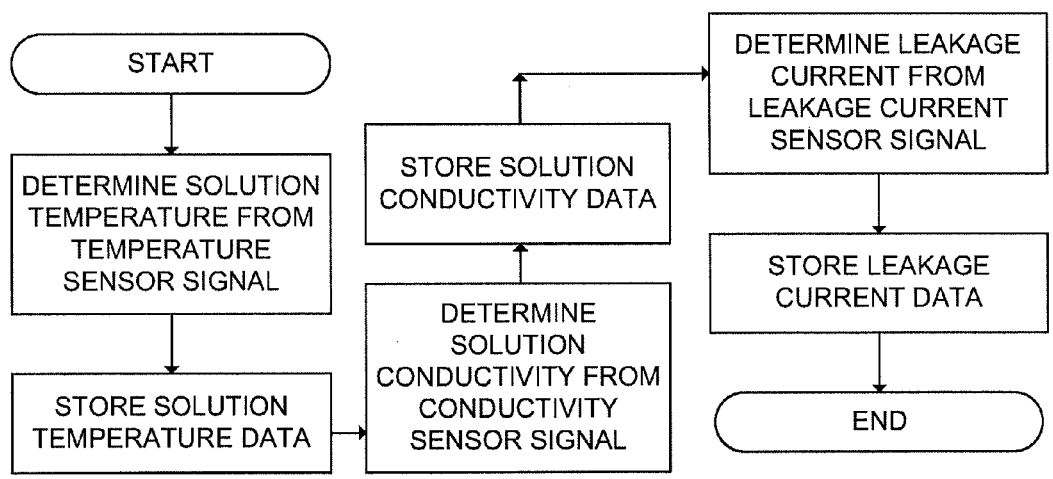
FIG. 6 is flow chart describing the steps for receiving and storing test data.

As shown in FIG. 1, the electrical test apparatus 100 may be connected to a computer 140 via an assortment of cables. The cables may be routed through a connection panel 305 as shown in FIG. 3. The computer 140 may be configured to receive signals from the temperature sensor 135 and the conductivity sensor 150 and store the signal data in a database as shown in FIG. 6. The computer 140 may include a data acquisition board which converts analog signals to digital signals which are readable by the computer 140. The computer 140 may monitor and record data during testing and store data in a database for future reference. For example, the computer 140 may monitor and record time, voltage, and leakage current during a wet high-potential test. The computer may also monitor and record data for identifying the device under test (DUT), such as its serial number. The computer 140 may continuously run through the steps shown in FIG. 6 at predetermined intervals to ensure adequate data collection. For instance, the computer may receive and record temperature, conductivity, and leakage current signals every second.

The computer 140 may include a software program that permits execution of one or more predefined test sequences. For instance, the software may enable a wet high-potential test to be executed with little or no manual input. For instance, a user may place a product into the test apparatus 100, close the lid 110, and initiate a program which automatically monitors test conditions, adjusts parameters, and records data during testing. The software may display a graphical user interface (GUI) on a monitor 155 associated with the computer 140. The graphical user interface may allow a user to input test parameters such as target temperature, test duration, and voltage. The graphical user interface may also display data acquired from sensors (e.g. 135, 150) in real-time while the test is in progress. The graphical user interface may allow the user to recall test data from the database and display and print charts and graphs generated from the stored data.

Figure 7:
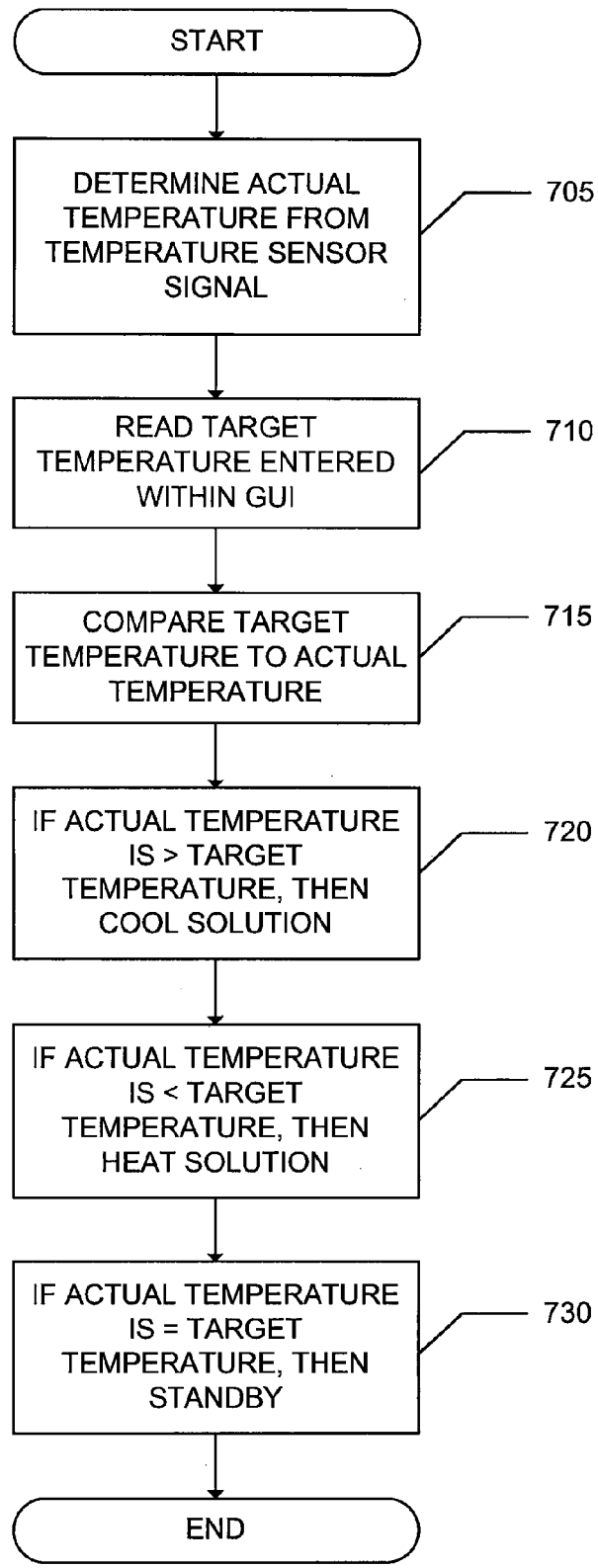
FIG. 7 is a flow chart describing the steps for controlling solution temperature.

The computer 140 may use the signal acquired from the temperature sensor to control a temperature control system 160. The temperature control system 160 may control the temperature of the solution 145 housed within the enclosure 105. A temperature control system 160 may include a heating system and a cooling system. For instance, the temperature control system may include a heating system including an electrical resistance heater. The temperature control system 160 may include a cooling system. For instance, the system 160 may include a refrigeration loop that circulates a refrigerant through tubing positioned within the enclosure 105. By circulating hot or cold fluid through the tubing, the system 160 can increase, decrease, or maintain a constant temperature of the solution 145. To facilitate control of the solution 145 temperature, the temperature control system 160 may include mechanical components 165, including, for example, a fluid reservoir, a compressor, and a pump. As show in FIG. 7, steps for controlling solution temperature may include determining the actual temperature of the solution using a signal received from the temperature sensor 135. The computer 140 may read the target temperature input into the GUI by the user. The computer 140 may compare the target temperature to the actual temperature. If the actual temperature is greater than the target temperature, the computer may command the temperature control system to cool the solution. Alternately, if the actual temperature is less than the target temperature, the computer may command the temperature control system to heat the solution. If the actual temperature is equal to the target temperature, the computer may command the temperature control system to standby until the actual temperature changes. The computer may continuously run through these steps during the test procedure at predetermined intervals to ensure adequate control of the solution. For instance, the computer may compare the actual temperature to the target temperature every second.

As shown in FIG. 1, a power supply. 170 may provide high voltage to a current-carrying conductor within a photovoltaic component 175 through a positive lead 171. The power supply may also include a ground lead 172 that may be connected to an electrical ground 180 attached to the enclosure 105. Leakage current may migrate from the current-carrying conductor and pass through the liquid solution 145 before arriving at the electrical ground 180. The leakage current may be measured with a leakage current sensor 185. The leakage current sensor 185 may sense current traveling through the ground lead 172 of the power supply 170. The computer 140 may be configured to receive signals from the leakage current sensor 185. As discussed above, the computer 140 may include a data acquisition board which converts analog signals to digital signals which are readable by the computer. The computer may then receive and store the signal data in a database.

For safety purposes, the test apparatus 100 may include a switch to detect the position of the lid 110. For instance, to protect the operator from accidental electrocution, the test apparatus 100 may not function unless the lid 110 is in a closed position. As shown in FIG. 2, a safety switch 205 may be positioned on a bottom surface 210 of the lid 110 and may detect the position of lid 110. Similarly, as shown in FIG. 4, the safety switch 405 may be positioned on the rim surface 215 of the enclosure 105 and may detect the position of lid 110. Alternately, a first contact (not shown) may be positioned on the bottom surface 210 of the lid 110 and a second contact (not shown) may be positioned on the rim surface 215 of the enclosure 105. The safety switch (e.g. 205, 405) may operate in any suitable way to disable the device from operating when the lid 110 is in an open position. For example, the safety switch may be released upon opening the lid 110, thereby breaking a circuit and disabling electrical power to the test apparatus 100.

Figure 5:
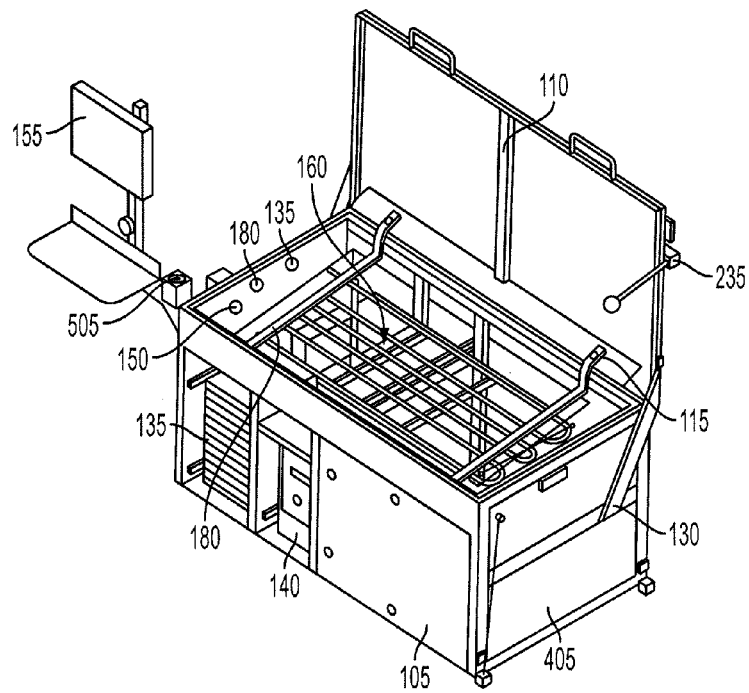
FIG. 5 is a perspective view of an electrical test apparatus.

The test apparatus may also include a safety button 505 as shown in FIG. 5. The safety button may function as a kill switch for the entire test apparatus 100. For instance, when the safety button is pressed, it may break a circuit and disable electrical power from flowing to the test apparatus 100. The safety button 505 should be placed in a position where the operator can easily access it.

As shown in FIG. 2, a test apparatus 100 may include a latch assembly including a first latch mechanism 130 and a second latch mechanism 235. The first latch mechanism 130 may be configured to mate with the second latch mechanism 235 to hold the lid in a closed position, as shown in FIG. 3. The latch assembly may include any suitable retention device including, for example, lock, ratchet, hook, snap, clasp, or buckle. To further protect the operator from accidental electrocution, the latch assembly may incorporate a second safety switch to disable power when the latch assembly is in an open position.

The solution may be any suitable conductive solution permitting a wet high-potential test to be executed. In particular, the solution may be a mixture of water (H2O) and sodium linear alkylaryl sulfonate, sodium xylene sulfonate, alkanolamide, and ethoxylated alcohol; or water and sodium benzeneoxybispropylenesulfonate, phosphate ester potassium salt, dipotassium hydrogen phosphate, and sulfuric acid disodium salt; or water and hydrogen chloride (HCl); or water and sodium chloride (NaCl); or water and potassium chloride (KCl); or water and potassium hydroxide (KOH); or water and sodium hydroxide (NaOH); or water and nitric acid (HNO$_3$); or water and sulfuric acid (H$_2$SO$_4$). The solution may be added to the test apparatus 100 by opening the lid 110 and pouring the solution 145 into the enclosure 105. A drain system 190 may be attached to the enclosure 105 to allow the solution to be drained after testing to deter bacteria growth within the system. The drain system 190 may include tubing and a valve to control the flow of solution 145. In addition, to prevent overflows during filling and transport of the test apparatus 100, the drain system 190 may include an overflow drain 195 which places an upper portion of the enclosure 105 in fluid communication with the drain system 190.

In one aspect, an electrical test apparatus for photovoltaic modules may include an enclosure configured to hold a photovoltaic module in a solution. The electrical test apparatus can include a lid attached to the enclosure, a leakage current sensor positioned within the enclosure and connected to a computer, a conductivity sensor positioned within the enclosure and connected to the computer, a temperature sensor positioned within the enclosure and connected to the computer, and a temperature control system substantially within the enclosure and connected to the computer. The leakage current sensor can measure leakage current between a photovoltaic module within the enclosure and an electrical ground within the enclosure. The conductivity sensor can measure the conductivity of a solution within the enclosure. The temperature sensor can measure temperature of the solution.

The computer may also include a graphical user interface. A target temperature of the solution may be defined within the graphical user interface. The computer may determine an actual temperature of the solution based on an output signal from the temperature sensor. Subsequently, the computer may compare the target temperature of the solution to the actual temperature of the solution. If the actual temperature is lower than the target temperature, the computer may command the temperature control system to heat the solution. If the actual temperature is higher than the target temperature, the computer may command the temperature control system to cool the solution. If the actual temperature is equal to the target temperature, the computer may command the temperature control system to standby. The computer may be configured to receive and store signal data from the leakage sensor, the conductivity sensor, and the temperature sensor.

The test apparatus may include a safety switch attached to the test apparatus and configured to disable power to the electrical test apparatus when the lid is in an open position. The test apparatus may include a safety button, attached to the test apparatus and configured to disable power to the electrical test apparatus when pressed. The test apparatus may include a drain. The temperature control system may include a heating system. In particular, the heating system may include an electrical resistance heater. The temperature control system may include a cooling system. In particular, the cooling system may include a refrigeration system. The test apparatus may also include a water level sensor. The test apparatus may deactivate itself if the water falls below a predetermined level. Alternately or additionally, the test apparatus may notify the operator if the water level falls below the predetermined level.

In another aspect, a method of testing a photovoltaic module may include connecting a conductor within a photovoltaic module to a power source and submersing the photovoltaic module in a solution contained in an electrical test apparatus. The electrical test apparatus can include an enclosure, a lid attached to the enclosure, a leakage current sensor, a temperature sensor, a conductivity sensor, and a temperature control system substantially within the enclosure. The leakage current sensor may be positioned within the enclosure and connected to a computer. The leakage current sensor can measure leakage current between a photovoltaic module within the enclosure and an electrical ground within the enclosure. The conductivity sensor may be positioned within the enclosure and connected to the computer. The conductivity sensor can measure conductivity of the solution. The temperature sensor may be positioned within the enclosure and connected to the computer. The temperature sensor can measure temperature of a solution within the enclosure. The method may include setting a target solution temperature within a graphical user interface associated with the computer, applying high voltage from the power source to the conductor within the photovoltaic module, and storing leakage current data in a database.

The method may further include storing temperature data in a database and storing conductivity data in a database. The method can include disabling power to the electrical test apparatus when the lid is in an open position. The method can include disabling power to the electrical test apparatus by pressing a safety button attached to the test apparatus. The step of setting a target solution temperature can include heating the solution to a target temperature. The step of heating the solution can include heating the solution with an electrical resistance heater. The step of setting a target solution can include cooling the solution to a target temperature. The step of cooling the solution can include cooling the solution with a refrigeration system. The step of setting a target solution temperature can include adjusting the solution temperature based on the target solution temperature and monitoring the temperature of the solution until the target solution temperature is obtained.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features illustrative of the basic principles of the invention.

What is claimed is:

1. An electrical wet test apparatus for photovoltaic modules, comprising:
   an enclosure configured to hold a photovoltaic module in a liquid solution; the enclosure having a support surface for supporting the photovoltaic module such that it is submerged in the liquid solution;
   a lid attached to the enclosure for closing the enclosure during a testing operation on the photovoltaic module;
   a leakage current sensor including an electrode positioned within the enclosure, the leakage current sensor being connected to a computer;
   a conductivity sensor positioned within the enclosure and connected to the computer;
   a temperature sensor positioned within the enclosure and connected to the computer;
   a temperature control system, including a heating/cooling member positioned within the enclosure so as to be submerged in the liquid solution within the enclosure, the temperature control system being connected to the computer; and
   a power source for supplying a voltage to an electrical lead of the photovoltaic module, when in the solution,
   wherein the computer administers a wet test of the photovoltaic module using data acquired from the leakage current sensor, the conductivity sensor and the temperature sensor.

2. The electrical wet test apparatus of claim 1,
   wherein the leakage current sensor measures leakage current between a photovoltaic module within the enclosure and an electrical ground within the enclosure,
   wherein the conductivity sensor measures the conductivity of a liquid solution within the enclosure, and
   wherein the temperature sensor measures temperature of the liquid solution.

3. The electrical wet test apparatus of claim 2,
   wherein the computer comprises a graphical user interface,
   wherein a target temperature of the liquid solution is defined within the graphical user interface,
   wherein the computer determines an actual temperature of the liquid solution based on an output signal from the temperature sensor,
   wherein the computer compares the target temperature of the liquid solution to the actual temperature of the liquid solution,
   wherein the computer commands the temperature control system to heat the liquid solution if the actual temperature is lower than the target temperature,
   wherein the computer commands the temperature control system to cool the liquid solution if the actual temperature is higher than the target temperature, and
   wherein the computer commands the temperature control system to standby if the actual temperature is equal to the target temperature.

4. The electrical wet test apparatus of claim 1,
   wherein the computer is configured to receive and store signal data from the leakage sensor,
   wherein the computer is configured to receive and store signal data from the conductivity sensor, and
   wherein the computer is configured to receive and store signal data from the temperature sensor.

5. The electrical wet test apparatus of claim 1, further comprising a safety switch attached to the electrical wet test apparatus, wherein the safety switch is configured to prevent the electrical wet test apparatus from operating when the lid is in an open position.

6. The electrical wet test apparatus of claim 1, further comprising a safety button attached to the test apparatus, wherein the safety button is configured to disable power to the electrical wet test apparatus when pressed.

7. The electrical wet test apparatus of claim 1, further comprising a drain.

8. The electrical wet test apparatus of claim 1, wherein the temperature control system comprises a heating system.

9. The electrical wet test apparatus of claim 8, wherein the heating system is an electrical resistance heater.

10. The electrical wet test apparatus of claim 1, wherein the temperature control system comprises a cooling system.

11. The electrical wet test apparatus of claim 10, wherein the cooling system is a refrigeration system.

12. A method of wet testing a photovoltaic module, comprising:
    connecting a conductor within a photovoltaic module to a power source;
    submersing the photovoltaic module in a liquid solution contained in an electrical wet test apparatus comprising:
       an enclosure having a support surface for supporting the photovoltaic module submersed in the liquid solution;
       a lid attached to the enclosure for closing the enclosure during an electrical wet test of the photovoltaic module;
       a leakage current sensor including an electrode positioned within the enclosure, the leakage current sensor being connected to a computer, wherein the leakage current sensor measures leakage current between a photovoltaic module within the enclosure and an electrical ground within the enclosure;

a conductivity sensor positioned within the enclosure and connected to the computer, wherein the conductivity sensor measures conductivity of a liquid solution within the enclosure;

a temperature sensor positioned within the enclosure and connected to the computer, wherein the temperature sensor measures temperature of the liquid solution; and a temperature control system, including a heating/cooling member positioned within the enclosure, wherein the enclosure is configured to hold the liquid solution and photovoltaic module, the heating/cooling member positioned within the enclosure so as to be submerged in the liquid solution within the enclosure;

setting a target solution temperature within a graphical user interface associated with the computer;

applying high voltage from the power source to the conductor within the photovoltaic module; and storing leakage current data in a database.

13. The method of claim 12, further comprising:
storing temperature data in a database; and
storing conductivity data in a database.

14. The method of claim 12, further comprising disabling the electrical wet test apparatus when the lid is in an open position.

15. The method of claim 12, further comprising disabling power to the electrical wet test apparatus when a safety button attached to the electrical wet test apparatus is pressed.

16. The method of claim 12, wherein the step of setting a target liquid solution temperature comprises heating the liquid solution to the target temperature.

17. The method of claim 16, wherein the step of heating the liquid solution comprises heating the liquid solution with an electrical resistance heater.

18. The method of claim 12, wherein the step of setting a target liquid solution temperature comprises cooling the liquid solution to a target temperature.

19. The method of claim 18, wherein the step of cooling the liquid solution comprises cooling the liquid solution with a refrigeration system.

20. The method of claim 12, wherein the step of setting a target liquid solution temperature comprises adjusting the liquid solution temperature based on the target liquid solution temperature and monitoring the temperature of the liquid solution until the target liquid solution temperature is obtained.

21. The electrical wet test apparatus of claim 1, wherein the computer is configured to control heating/cooling conditions of the liquid.

* * * * *